June 7, 1966  M. P. EHRLICH  3,254,369
APPARATUS FOR THE MANUFACTURE OF COMPLIANT CABLE
Original Filed Nov. 3, 1961

INVENTOR.
MELVIN P. EHRLICH
BY Amster & Levy
ATTORNEYS

United States Patent Office 3,254,369
Patented June 7, 1966

3,254,369
APPARATUS FOR THE MANUFACTURE OF COMPLIANT CABLE
Melvin P. Ehrlich, Plainview, N.Y., assignor to Nuclear Research Associates, Incorporated, Long Island City, N.Y., a corporation of Delaware
Original application Nov. 3, 1961, Ser. No. 150,093. Divided and this application Sept. 13, 1962, Ser. No. 223,498
3 Claims. (Cl. 18—13)

The present invention relates generally to compliant electrical cables and like devices, and in particular to an apparatus for manufacturing longitudinally compliant electrical cables of the multiple conductor and coaxial types, and to improvements in the construction of such cables. This is a division of my copending application, Serial No. 150,093, entitled Electrical Device and Method of Manufacture filed on November 3, 1961, now abandoned.

Many type of electrical cables are available for the transmission of signal energy from one point to another, with reasonably low signal attenuation. However, of recent times there has developed a need for electrical cables which are capable of transmitting signal energy from one point to another with a high order of mechanical decoupling. A typical application is in underwater detection systems of the sonobuoy type wherein an underwater hydro-phone is suspended from a float on the surface of a body of water by a longitudinally compliant cable which makes electrical connection from the underwater hydro-phone to a transmitter carried by the float. Signals picked up by the hydro-phone or the microphone are fed via the electrical cable to the transmitter which in turn transmits the detected signals to an appropriate monitor, such as an overhead airplane or the like. A primary requisite for this type of system is that the drag exerted by the pendent cable and hydro-phone does not cause the float containing the transmitter to be pulled under the surface or upset for this would disrupt signal transmission to the monitor and at best provide intermittent operation. Further, the use of a longitudinally compliant cable between the underwater hydro-phone and the surface float and transmitter effectively reduces the generation of spurious signals which manifest themselves as undesired noises in the system. Accordingly, there exists a need for an electrical cable, which apart from its signal transmission properties, serves as a mechanical decoupling when connected in a system where the cable is stretched and loaded. Preferably for use in this environment, the cable should also be relatively inexpensive to manufacture since it will be expendible along with the remaining components of the sonobuoy system.

Broadly, it is an object of the present invention to provide an extruder apparatus for the extrusion of sheathing material about a core. Specifically, it is within the contemplation of the present invention to provide an extruder head adapted to receive a core about which is deposited a sheathing material to produce an assembled core and extruded sheathing.

In accordance with the present invention, there is provided an extruder head comprising a body which is formed with a central cavity and a circular extrusion orifice in communication with the cavity. The walls of the cavity, adjacent the extrusion orifice are formed in frustro-conical fashion decreasing in diameter toward said orifice. An extruder pipe is connected to the body of the extruder head, in communication with the cavity, at a location removed from the extrusion orifice. A torpedo is mounted within the cavity and in alignment with the extrusion orifice and includes a central opening along its axis for the passage of a core into the extruder head, through the torpedo and out of the extruder head through the extrusion orifice. The torpedo is formed at its end adjacent the orifice with frustro-conical walls of decreasing diameter toward the orifice. The included angle of the frust-conical torpedo walls is less than the included angle of the frustro-conical cavity walls thereby defining an annular outlet passage from the cavity of decreasing cross-section toward the extrusion orifice between the cavity walls and the walls of the torpedo.

The above brief description, as well as further objects, features and advantages of the present invention will be more fully appreciated by reference to the following detailed description of an illustrative embodiment of the present invention, when taken in conjunction with the accompanying drawings, wherein.

Figure 2:
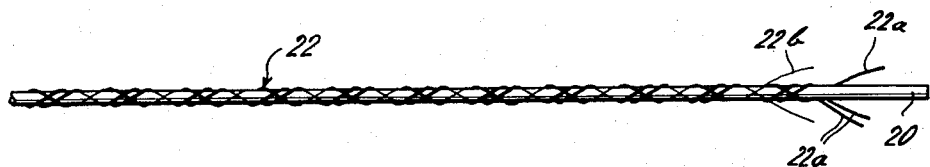
FIG. 2 is an elevational view showing the core of FIG. 1 distended to approximately twice its length and having supported thereon a first or inner conductor in the form of a braid including intertwined electrically conducting and reinforcing strands.
Figure 3:
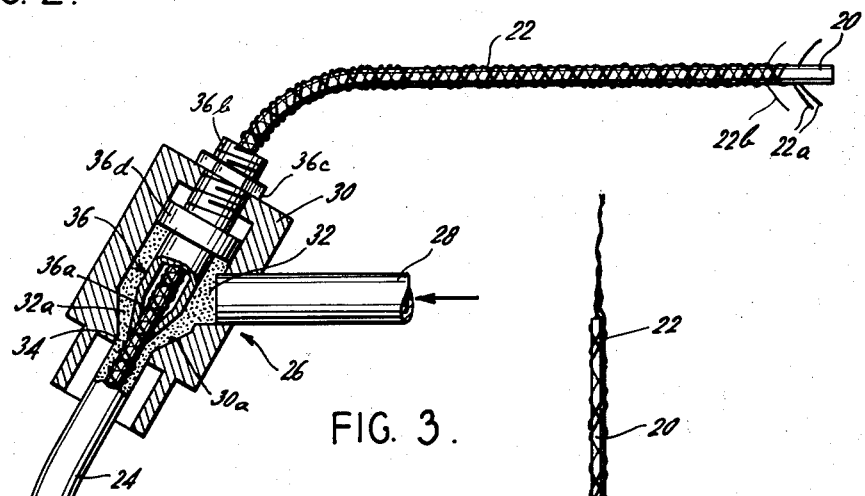
Figure 4:
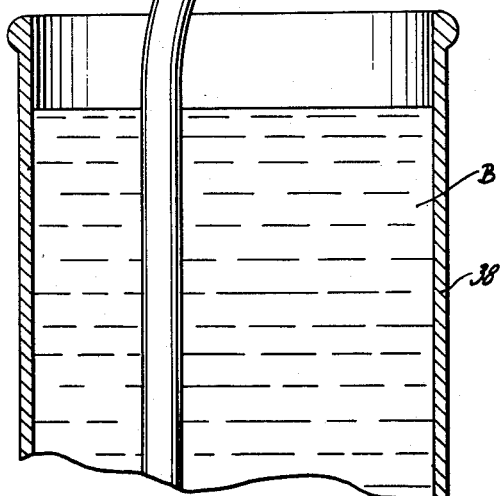

FIG. 3 is an elevational view, with parts in section, showing an extrusion system for forming an insulating sheath about the core and conductor sub-assembly shown in FIG. 2 and further showing a means for curing the insulating sheath; and, FIG. 4 is an elevational view of a partially completed length of complant cable formed with an extruded insulating sheath by the extrusion and curing apparatus shown in FIG. 3.

Referring now specifically to the drawings, reference will be made to a typical extensible cable assembly and the process of its manufacture in order to show the usefulness and function of the apparatus according to the present invention.

Figure 1:
FIG. 1 is an elevational view of a length of a core of resilient elastomeric material which is longitudinally distensible, shown in a relaxed condition preliminary to the formation thereon of a first or inner electrical conductor.

Referring first to FIG. 1, there is shown a typical inner core 20 of resilient elastomeric material which is longitudinally distensible and serves as a supporting mandrel during the successive cable-forming steps and ultimately as the inner stretchable support for the final cable. Various types of elastomeric materials are suitable for the manufacture of the core. In a typical commercial embodiment, the core may be fabricated of an extruded silicone elastomer. A typical silicone elastomer is manufactured by the Silicone Division of Union Carbide Corporation under the trademark Union Carbide KW 1300. The durometer and cross section of the elastomeric core 20 is selected to enable the required longitudinal distension thereof without exceeding the tensile strength of the material. In a typical coaxial cable, the core 20 is circular in cross section and has an outer diameter of the order of 75 mils.

Referring to FIG. 2, there is shown the elastomeric core 20 stretched to in excess of twice its length and having supported thereon a conductor 22 of electrically conducting material arranged in a configuration to be longitudinally distensible. In this illustrative embodiment, the conductor 22 is a braiding of electrically conducting strands 22a and reinforcing strands 22b. In a typical construction, the electrically ocnducting strands 22a may be of copper, while the reinforcing strands 22b may be of an appropriate synthetic having relatively good tensile strength, such as nylon or Dacron. The inner braided conductor 22 is formed on a conventional braiding machine with provision for prestretching the core 20 to establish the desired degree of compliance. In braiding the inner conductor 22, the number of braids per inch is established such that the interstices between successive braids allow the core 20 with the braided inner conductor 22 thereon to return to approximately the same length as the core 20 without the braided inner conductor 22 (see FIG. 1).

The sub-assembly of the elastomeric core 20 and the longitudinally-distensible inner conductor 22 is preferably provided with an extruded intermediate insulating sheath 24 of an elastomeric material by the improved extrusion apparatus according to the present invention, shown in FIG. 3 and generally designated by the reference numeral 26. The extrusion apparatus 26 includes a substantially horizontally extending extruder outlet pipe 28 which feeds the elastomeric material from a conventional extruder to an extruder die or head 30 provided with a cavity 32 terminating at its lower end in an extrusion orifice or Venturi aperture 34. Extending longitudinally of the cavity 32 towards the aperture or orifice 34 is the torpedo 36 of the extrusion die or head 30 which is mounted in any appropriate fashion and provides an axial through passage for feeding the sub-assembly of the core 20 and the inner conductor 22 through the extrusion die or head 30. The frustro-conical tip 36a of the torpedo 36 and the coextensive frustro-conical bounding wall 30a of the die 30 are arranged relative to each other to provide an annular outlet passage 32a of progressively decreasing cross section which communicates with the Venturi aperture 34. The decreasing cross section of the annular outlet passage 32 brings about an increase in the pressure and velocity of the extruded material as it flows towards the Venturi aperture 34 which establishes a rate of flow at the interface between the extruded material of the insulating sheath and the sub-assembly 20, 22 to provide a linear feed of the sub-assembly at a rate that will establish an insulating sheath 24 of a desired cross section without elongating or pulling on the sub-assembly 20, 22. After the extruded sheath 24 and the encased sub-assembly 20, 22 leave the extrusion aperture 34, the rate of feed is materially decreased due to the so-called Venturi action. However, during the crucial period when the extruded material flows into contact with the sub-assembly, 20, 22, the increased pressure and velocity is sufficient to achieve the desired rate of linear feed of the sub-assembly 20, 22 and the insulating sheath 24 is extruded onto the sub-assembly while the latter is substantially tensionless and in a relaxed condition. The axis of the extruding die or head 30 and of the torpedo 36 is disposed at an obtuse angle with respect to the axis of the extruder outlet pipe 28 such that the component of extruder pressure available axially in the extruder head 30 (which will act in the direction of linear advance of the sub-assembly 20, 22) is somewhat greater than in an arrangement wherein the axis of the extruder head 30 would be disposed at approximately a right angle to the axis of the extruder outlet pipe 28. The torpedo 36 is mounted within the extruder head 30 at the end opposite from the orifice 34 by means of a threaded shaft extension 36b secured in a complementary threaded opening in the body of the extruder head 30 and locked in position by a lock nut 36c. A positioning collar 36d is formed coaxially about the torpedo 36 and engages the inner cylindrical walls of the cavity 32 to form one wall of the cavity 32. By means of rotating the torpedo 36 within the extruder head 30, the distance between the frustro-conical tip 36a and the orifice 34 may be varied, thereby to vary flow rates for material through the orifice 34.

The extrusion orifice 34 must be of a diameter and length to produce a proper pressure ratio with a wire of given diameter. It has been found that most satisfactory results are obtained where the ratio of the length of the extrusion orifice divided by the sum of the diameter of the orifice minus the diameter of the wire, is approximately 1. Expressed in an equation the ratio is as follows:

$$\frac{L}{D-W} \approx 1$$

where L is the length of the orifice 34, D is the diameter of the orifice 34, and W is the diameter of the wire 22. Both the pressure ratio requirements and the requirement with regard to positioning the torpedo 36 with respect to the orifice 34 must be met in order to insure efficient operations of the device.

In this illustrative embodiment, the sheathing 24 is cured by submersion in a receptacle 38 containing a bath B. The bath B may be of a material such as glycerine which is elevated to a temperature of approximately 350° F. Of course, a variation of other curing means may be employed.

From the foregoing, it will be appreciated that the extrusion apparatus disclosed and described herein finds useful application for the fabrication of sheathing about a core.

Although the drawings and disclosures herein describe one particular embodiment of the present invention, other embodiments may be constructed without departing from the teachings of the invention. Therefore, the following claims should be interpreted broadly consistent with the spirit and scope of the invention.

What I claim is:

1. An extruder head for applying an extensible sheathing onto a compliant cable core in an apparatus which is free from any power source for pulling a core through said extruder head comprising a body, said body having a central cavity formed therein and a circular extrusion orifice at one end in communication with said cavity, said cavity being formed adjacent said orifice with frustro-conical walls of decreasing diameter toward said orifice, an extruder input pipe connected to said body in communication with said cavity at a location removed from said orifice for the delivery of material to be extruded, a torpedo positioned within said head in alignment with said orifice, and means adjustably mounting said torpedo within said cavity for movement toward and away from said orifice, said torpedo having a central cylindrical opening along its axis for the passage of a core into said extruder head, through said torpedo and out of said extruder head through said orifice, said torpedo being formed at its end adjacent said orifice with frustro-conical walls of decreasing diameter toward said orifice, the included angle of said frustro-conical torpedo walls being less than the included angle of said frustro-conical cavity walls defining an annular outlet passage of decreasing cross-section between said cavity walls and said torpedo, said orifice being cylindrical in shape and having a ratio of its length divided by the same of its diameter minus the diameter of the central cylindrical opening of said torpedo, the flow of material to be extruded through said outlet passage being the sole means of transporting said core through said torpedo and said body.

2. An extruder head for applying an extensible sheathing onto a compliant cable core in an apparatus free from any power source for pulling a core through said extruder head for forming a sheathing about a compliant wire of a given diameter comprising a body, said body having a central cavity formed therein and a circular extrusion orifice at one end in communication with said cavity, said cavity being formed adjacent said orifice with frustro-conical walls of decreasing diameter toward said orifice, delivery means in communication with said cavity at a location removed from said orifice for the delivery of material to be extruded, said delivery means being angled to open into said cavity to deliver material into said cavity in the direction of said orifice, and a torpedo positioned within said body and within said cavity in alignment with said orifice, said torpedo having a central opening along its axis for the passage of said compliant wire into said extruder head, through said torpedo and out of said extruder head through said orifice, said torpedo and the frustro-conical walls of said cavity defining an annular outlet passage of decreasing cross-section toward said orifice between said cavity wall and said torpedo, said orifice being cylindrical in shape and having a ratio of its length divided by the sum of its diameter minus the diameter of the central opening of said torpedo which is approximately one, the flow of material to be extruded through said outlet being the sole means for transporting said compliant wire through said tropedo and said body.

3. An extruder head for forming a sheathing about a compliant wire of a given diameter in an extrusion apparatus free from any power source for pulling said compliant wire through said head comprising a body, said body having a central cavity formed therein and a circular extrusion orifice at one end in communication with said cavity, said cavity being formed adjacent said orifice with frustro-conical walls of decreasing diameter toward said orifice, delivery means in communication with said cavity at a location removed from said orifice for the delivery of material to be extruded, a torpedo positioned within said body and within said cavity in alignment with said orifice, said torpedo having a central opening along its axis for the passage of said compliant wire into said extruder head, through said torpedo and out of said extruder head through said orifice, said torpedo and the frustro-conical walls of said cavity defining an annular outlet passage directed toward said orifice between said cavity wall and said torpedo, said orifice being cylindrical in shape and having a ratio of its length divided by the sum of its diameter minus the diameter of the compliant wire which is approximately one, the flow of material to be extruded through said outlet being the sole means for transporting said compliant wire through said torpedo and said body, and means mounting said torpedo for axial movement toward and away from said orifice for varying the volume of said annular outlet passage to said orifice.

References Cited by the Examiner

UNITED STATES PATENTS

| | | | |
|---|---|---|---|
| 325,363 | 9/1885 | Royle et al. | 18—13 |
| 441,808 | 12/1890 | Royle et al. | 18—13 |
| 1,419,090 | 6/1922 | Williams | 18—13 |
| 2,471,752 | 5/1949 | Ingemanson. | |
| 2,522,364 | 9/1950 | Grana | 18—13 |
| 2,979,431 | 4/1961 | Perrault | 18—13 |

FOREIGN PATENTS

| | | |
|---|---|---|
| 513,812 | 11/1920 | France. |
| 970,430 | 6/1950 | France. |
| 881,538 | 7/1953 | Germany. |
| 535,311 | 4/1941 | Great Britain. |
| 690,967 | 4/1953 | Great Britain. |

WILLIAM J. STEPHENSON, *Primary Examiner.*

ROBERT F. WHITE, MICHAEL V. BRINDISI,
*Examiners.*

L. S. SQUIRES, *Assistant Examiner.*